United States Patent [19]
van Deventer et al.

[11] Patent Number: 5,315,425
[45] Date of Patent: May 24, 1994

[54] OPTICAL TRANSMISSION NETWORK WITH FREQUENCY LOCKING MEANS

[75] Inventors: Mattijs O. van Deventer, Leidschendam; Johan P. Bekooij, Zoeterwoude-Rijndijk, both of Netherlands

[73] Assignee: Koninklijke PTT Nederland N.V., Groningen, Netherlands

[21] Appl. No.: 754,746

[22] Filed: Sep. 4, 1991

[30] Foreign Application Priority Data

Sep. 11, 1990 [EP] European Pat. Off. ........ 90202410.8

[51] Int. Cl.⁵ ...................... H04B 10/24; H04J 14/02
[52] U.S. Cl. .................................. 359/153; 359/114; 359/125; 359/191; 359/121
[58] Field of Search ............... 359/114, 125, 152, 153, 359/191, 121; 370/30

[56] References Cited

U.S. PATENT DOCUMENTS

| | | | |
|---|---|---|---|
| 4,489,413 | 12/1984 | Richmond | 370/30 |
| 4,685,099 | 8/1987 | White | 370/30 |
| 5,077,731 | 12/1991 | Omiya | 370/30 |

FOREIGN PATENT DOCUMENTS

| | | | |
|---|---|---|---|
| 0298598A2 | 1/1989 | European Pat. Off. | |
| 0122344 | 6/1987 | Japan | 359/114 |
| 0180137 | 7/1989 | Japan | 359/114 |
| WO87/01874 | 3/1987 | PCT Int'l Appl. | |

OTHER PUBLICATIONS

Abstract of Japan, vol. 10, No. 104(E-397)[2161], Apr. 19, 1986; & JP-A-60 242 739 (Nippon Denki) Feb. 12, 1985.

*Primary Examiner*—Leslie Pascal
*Attorney, Agent, or Firm*—Frishauf, Holtz, Goodman & Woodward

[57] ABSTRACT

Frequency stabilizing in a, for instance star/branched-tree shaped, network can be well executed by locking the frequencies (f1) of the transmitters (T1) in the network center to a common reference frequency source (CFC) and, moreover, per duplex connection, locking (at a fixed frequency distance) the frequency (f2) of the subscriber's transmitter (T2) to the transmission signal (t1) as received from the network center's transmitter (T1). Per duplex connection only the subscriber's local oscillator (L2) has to be tuned so that the transmission signal from the network center is received optimally. If the subscriber's local oscillator is tuned thus and the subscriber transmitter's frequency has the right frequency offset to the tuned local oscillator frequency (f4), at the network center's side, signals from the subscriber's transmitter will be received optimally too if the local oscillator (L1) of the network center's receiver (R1) is set at a certain (predetermined) frequency offset to the signal transmitted to the subscriber's receiver.

Frequency setting, at the network center's side and at the subscriber's side, can be executed by means of auxiliary receivers (R1a, R2a) and AFC-units, generating the various frequency control signals, or by means of the receivers (R1, R2) already in use, provided with multiple pass filters and AFC-units. For achieving relative low IF frequencies, certain frequency orders are preferred.

9 Claims, 3 Drawing Sheets

ELECTRICAL SIGNAL c1 CONTROLS FREQUENCY f1 OF OPTICAL SIGNAL t1
ELECTRICAL SIGNAL c2 CONTROLS FREQUENCY f2 OF OPTICAL SIGNAL t2
ELECTRICAL SIGNAL c3 CONTROLS FREQUENCY f3 OF OPTICAL SIGNAL l1
ELECTRICAL SIGNAL c4 CONTROLS FREQUENCY f4 OF OPTICAL SIGNAL l2 d1, d2: DATA SIGNALS

OPTICAL TRANSMISSION NETWORK WITH FREQUENCY LOCKING MEANS

BACKGROUND OF THE INVENTION

The invention relates to an optical transmission network, comprising an optical transmission medium with one or more optical fibers, to which, at one side, one or more first optical transceivers are connected and to which, at the other side, one or more second transceivers are connected, said first transceivers each having a first transmitter and a first receiver and said second transceivers each having a second transmitter and a second receiver, a first transmission signal being transmitted by the first transmitter of a first transceiver and being received by the second receiver of a second transceiver, and a second transmission signal being transmitted by the second transmitter of that second transceiver and being received by the first receiver of that first transceiver.

Lasers for optical communications have the property that their optical frequency suffers from fluctuations and drift. In a coherent point-to-point connection the receiver usually is tuned to the transmitting frequency of the transmitter. The receiver follows the (opposite) transmitter by means of automatic frequency control (AFC).

In a coherent network with many transmitters and receivers, distributed all over the network, a rather complex solution will be necessary. Some different solutions within this field are known:

With a scanning spectrum analyser (for instance with a Fabry-Perot interferometer or a wavemeter) the frequencies of the several transmitter lasers are locked; the spectrum analyser itself may be stabilized by means of an atomic or molecular spectrum line. A disadvantage of this method is that all laser signals have to be able to be measured and controlled at one (central) location [1].

All optical signals are commonly put through one multifrequency passfilter (for instance a ring resonator or a Fabry-Perot filter), the various laser frequencies being set at the various pass frequencies of that passfilter. This solution has the same disadvantage as the former solution, viz. the said central controllability of the lasers in use [2].

All optical signals are locked to a common reference signal, for instance a frequency comb signal, generated by a comb generator. This solution requires extra optical hardware for distribution of the comb signal.

The frequency of each separate laser may be locked to an atomic or molecular resonance frequency (spectral line). A serious disadvantage is that only rather few resonance frequencies are available and besides this method is rather complex, inflexible and expensive [3].

The distances between the laser frequencies could be chosen such that any collision will be excluded, but this method would imply a very inefficient use of the optical bandwidth and besides the tuning range of lasers is limited.

Several combinations and variants of the above methods are known.

REFERENCES

[1] Davis, A. W.; Hadjifotiou, A.; King, J. P., et al Filling up the fibre-experimental work towards optical coherent multichannel systems Second IEE National Conference on Telecommunications (Conf. Publ. No. 300), 2–5April 1989, IEE, PP. 88–93

[2] Glance, B.; Fitzgerald, P. J.; Pollack, K. J., et al Frequency stabilisation of FDM optical signals Electron. Lett. (GB), vol. 23, no. 14, PP. 750–2, July 1987

[3] Villeneuve, B.; Cyr, N.; Tetu, M. Use of laser diodes locked to atomic transitions in multi-wavelength coherent communications Electron. Lett. (GB), vol. 24, no. 12, PP. 736–7, June 1988

SUMMARY OF THE INVENTION

In an optical transmission network as indicated above, in each subscriber station, the frequency of the transmitted signal is kept in a fixed relationship to the frequency of the signal received from the transmitter of one of the central transceivers. If, in that network center, the frequency of that transmission signal is locked to a reference frequency source, the frequency of the signal transmitted by the subscriber station will be locked too. In a, for instance, star/branched tree network, the frequencies of all transmitters in the network center may be locked to one common reference frequency. By locking, in the subscriber station, the transmitter's frequency to the received frequency, viz, by keeping a fixed relationship between those frequencies not only the frequencies of the transmission signals of the various transmitters within the network center will be locked (by said common reference source), but the frequencies of the signals transmitted by the transmitters of the various subscribers will be locked too. In this way the (various) frequencies of all the transmitters in the network, both at the network center's side and at the subscriber's side, will be locked by one common frequency reference source in a rather simple way.

According to the present invention, ion a subscriber station, a received signal, transmitted on one of the central transcribers, is mixed with a local oscillator signal, the frequency of which is tuned so that the reception of that received signal has its optimum, while the frequency of the signal to be transmitted back to the network center is kept in a fixed relationship to the frequency of that tuned local oscillator signal; in the central transceiver, the signal received from the subscriber station is mixed with a local oscillator signal, the frequency of which is not, like in the subscriber station, tuned so that the reception of the received signal has its optimum, but, contrary to that, the local oscillator of the network center is kept in a fixed relationship to the frequency of the signal (originally) transmitted by that central transcriber to the subscriber station. The invention is based on the observation that, rather surprisingly, the network center's receiver needs not to be tuned (by varying its local oscillator signal frequency) to the frequency of the received signal in the usual way, viz, by means of an "interactive" receiver output optimalization loop (AFC), but, contrary to that, the frequency of the local oscillator of the network center's receiver can always be kept in a fixed relationship to the frequency of the signal originally transmitted by the network center's transcriber. Due to the strict relationship between the subscriber station's transmitter frequency and the network center's transmitter frequency, tuning the network center's receiver to the subscriber station's transmitter frequency will not be necessary, but keeping the frequency of the local oscillator signal of the network center's receiver in a fixed relationship to the frequency of the transmitter belonging to the same transceiver will operate very well and will cost no tuning time at all.

It is noted that keeping in a subscriber station frequency of the signal to be transmitted back to the network center in a fixed relationship to the frequency of the tuned local oscillator signal may to be known as such from reference [4]. The present invention is to be seen in the combination of, in the subscriber station, keeping the frequency of the signal to be transmitted to the network center in a fixed relationship to the frequency of the tuned local oscillator signal, and, in the network center's transcriber, mixing the signal received form the subscriber station with a local oscillator signal, the frequency of which is not tuned, like in the subscriber station, but is kept in a fixed relationship to the frequency of the signal originally transmitted by the central transceiver.

In fact, only at one point in the "downstream-upstream-chain" of the duplex connection, viz. in the second (downstream) receiver, frequency tuning (by tuning the second local oscillator signal frequency to the first transmission signal) is executed, while the remaining laser frequencies are locked strictly, viz. the first transmitter laser to the reference frequency source, the first local oscillator signal laser to the first transmitter laser, and the second transmitter laser to the (tuned) second local oscillator signal. The preferred strict locking of the first local oscillator's frequency to the first transmitter frequency offers moreover the attractive possibility that at each moment another subscriber may transmit its transmission signal on the same frequency, due to which transmitting in the so called Asynchronous Tranfer Mode (ATM) is possible because, due to the locking scheme according to the present invention, excessive synchronisation/acquisition delays will be avoided.

Optical receivers generally have the property to have relatively less noise at relative low IF frequencies (the intermediate frequencies, which result from mixing the optical input signal with the internal local oscillator signal). For that reason it is preferred to choose the local oscillator's frequency close to the opposite transmitter's transmission frequency to get the preferred low IF signal. The "own" transmitter's transmission frequency can be chosen at a greater distance, to prevent interference. There are four equivalent preferred options relating to the order of the separate frequencies. If the frequency of the first transmitter's transmission signal is indicated by f1, the frequency of the second transmitter's transmission signal by f2, the frequency of the local oscillator in the first receiver by f3, and the frequency of the local oscillator in the second receiver by f4, the preferred increasing orders can be indicated by: f1-f4-f3-f2, f2-f3-f4-f1, f4-f1-f2-f3 and f3-f2-f1-f4. In all these cases the IF signal of the first receiver and second receiver has its minimum frequency: the first receiver's IF signal frequency is $|f2-f3|$ and the second receiver's IF signal frequency is $|f1-f4|$, so both frequencies are the result of two successive frequencies.

Relative to the implementation of the invention's measures, there are two preferred options: a more optical implementation and a more electrical implementation. In the more optical implementation each transceiver unit (both in the network centre and at the subscriber's side) contains an auxiliary receiver and an AFC-unit, viz. in the subscriber transceiver for locking the second transmitter's frequency to the second local oscillator frequency and in the network centre transceivers for locking the first local oscillator's frequency to the first transmitter's frequency. In the more electrical implementation the function of the auxiliary (optical) receivers is executed by electric filters, in combination with the (main) receivers already present.

EMBODIMENTS OF THE INVENTION

Figures

DESCRIPTION

Figure 1:
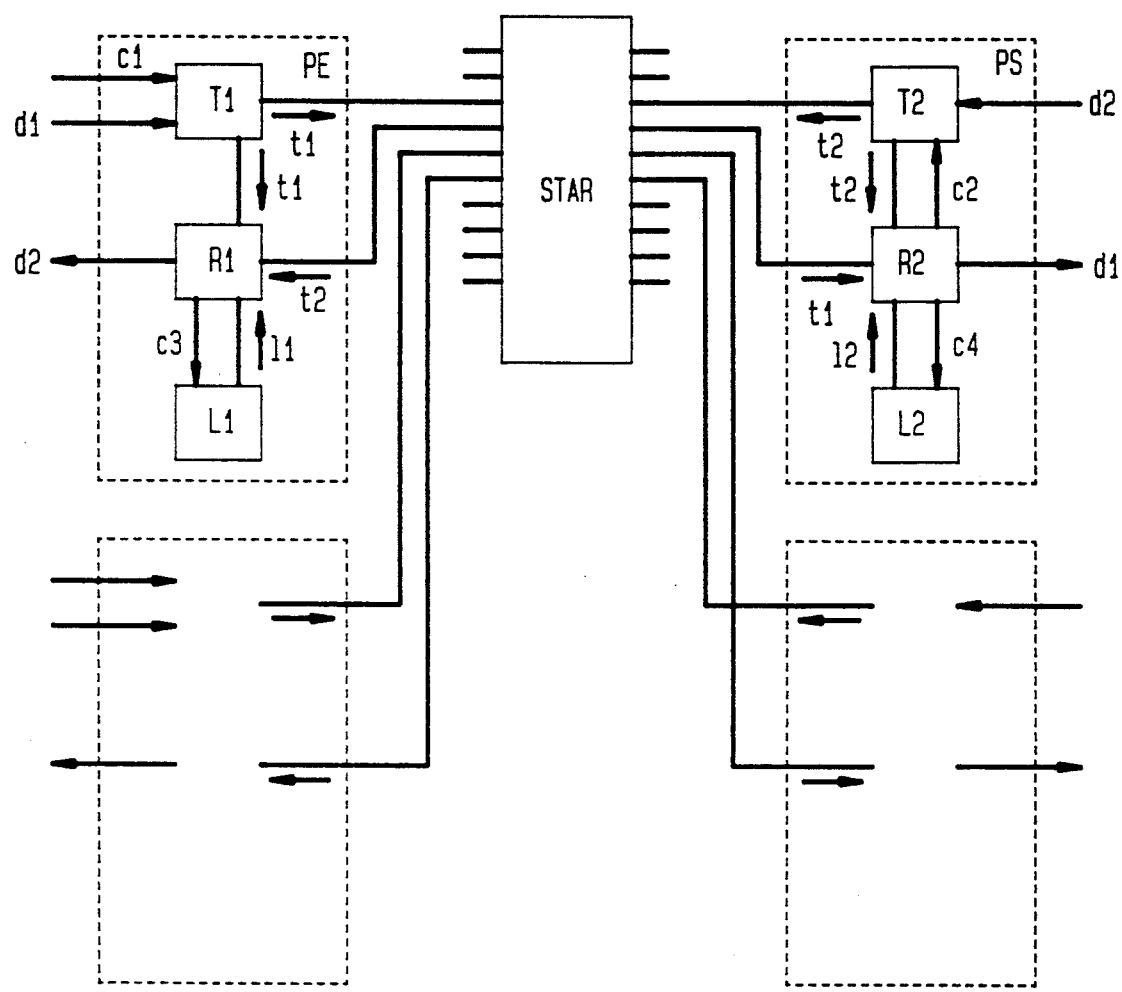
FIG. 1 shows schematically an embodiment of the invention.

FIG. 1 shows a telecommunication exchange which can make a duplex connection with a subscriber device PS via a passive optical star/branched-tree network STAR and an optical transmission line. The exchange is provided with a number of optical I/O-ports PE, each of them consisting of an optical transmitter T1 and an optical receiver R1 provided with a local laser L1.

Equally, a subscriber comprises an optical I/O-port PS, consisting of an optical transmitter T2 and an optical receiver R2 provided with a local laser L2. A signal from a port PE of the exchange will be transmitted by transmitter T1 as a coherent optical optical transmission signal t1, the frequency is locked to a reference frequency source (not shown) under the control of a control signal c1. Via the network STAR and a transmission line signal t1 will be transmitted to the subscriber's receiver R2 in which signal t1 will be mixed with the local laser signal l2, resulting in an electric IF output signal d1 with the frequency $|f1-f4|$. The frequency f4 of the local laser signal l2 is tuned—in a way, well known by those skilled in the art—by means of a control signal c4 from the receiver R2 thus that the receiver's IF signal has a predetermined frequency, at which the receiver's demodulated output signal has its optimum.

A signal from the subscriber PS will be transmitted by transmitter T2 as an optical coherent optical transmission signal t2. Via the transmission line and the transmission network STAR signal t2 will be transmitted to the receiver R1 in which signal t2 is mixed with the signal l1 from the local laser L1, resulting in an electric IF output signal with the frequency $|f2-f3|$. The frequency f2 of transmission signal t2 has a fixed distance to the frequency f4 of the (tuned) local laser signal l2; this fixed distance is maintained under the control of a control signal c2. The frequency of the local laser L1 is not—as usually done—tuned like the local laser L2 in the subscriber device, but, contrary to that, this frequency has a fixed distance to the frequency of the transmission signal t1 of the exchange port transmitter R1. This fixed distance is kept up under the control of a control signal c3.

So the complete duplex connection is formed by a downstream connection (the first transmission signal) and an upstream connection (the second transmission signal), the downstream connection frequency being locked by a (common) reference frequency and the upstream connection frequency being locked to the downstream connection frequency as tight as possible, only using one single tuning operation (viz. in the subscriber's receiver) for the complete duplex connection.

Figure 2:
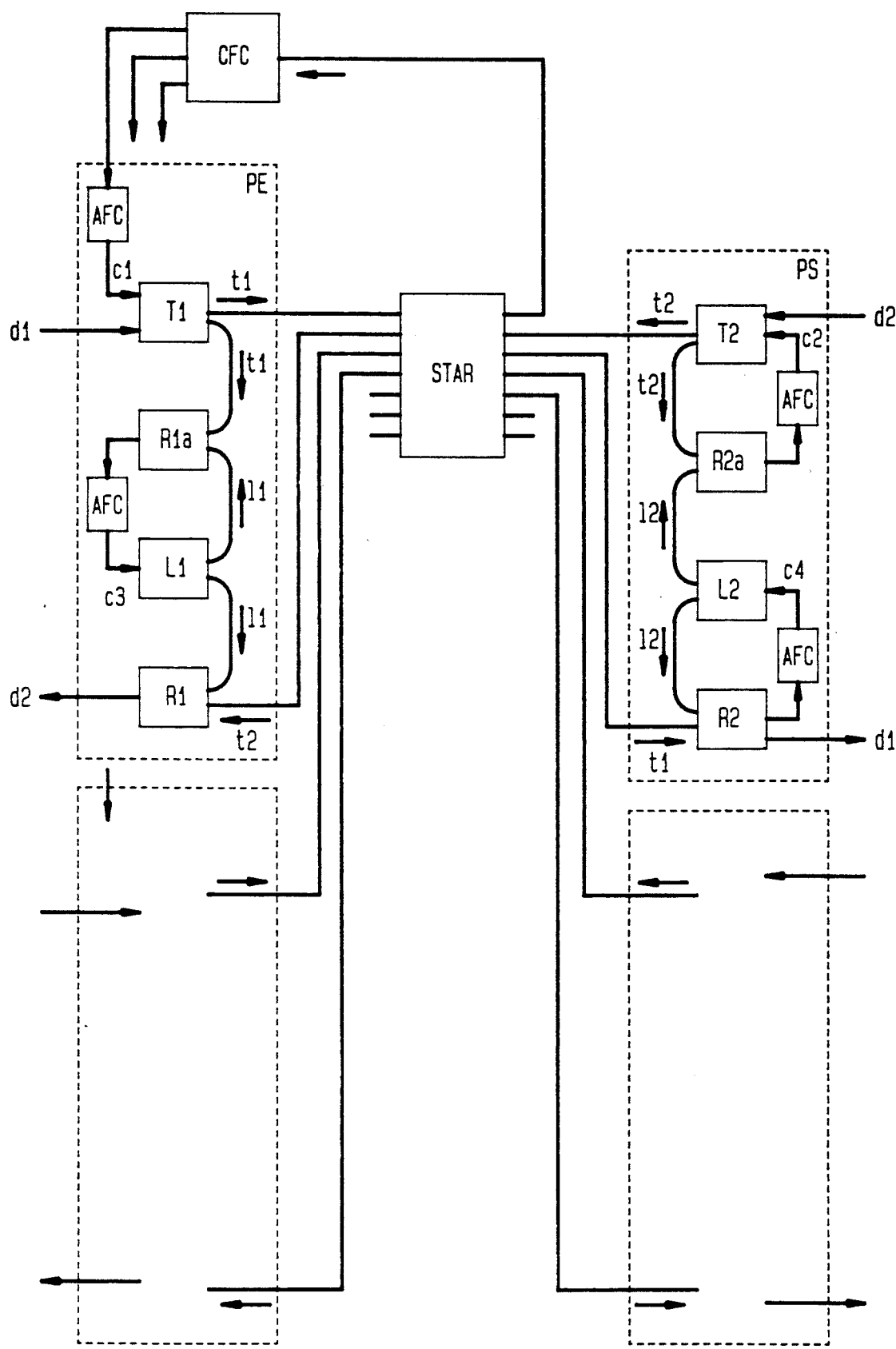
FIG. 2 shows a first preferred implementation of the invention, in which frequency locking is executed by means of auxiliary receivers and AFC-units.

In FIG. 2 the above embodiment of the invention is elaborated more in detail, making use of an auxiliary receiver and an AFC-unit in the subscriber's port PS and in each network centre's port PE, both for achieving the control signals c2, c3 and c4 for setting the frequencies f2, f3 and f4 respectively.

To lock the frequency f1 of the transmission signal t1 to that of a central reference source, the transmission signal t1 is—via the network STAR—supplied to a Common Frequency Controller CFC (a spectrum analyser) which controls, via an AFC-unit, the frequency setting of the first transmitter T1, under the control of control signal c1. The control signal c1 from the AFC-unit has an error value until the transmitter frequency has its correct value, indicated by the spectrum analyser CFC.

At the subscriber's side the first transmission signal t1 is mixed with the second local oscillator signal l2, resulting in an IF signal which is fed to an AFC-unit. In this AFC-unit the frequency of the IF signal is compared with a certain frequency, on which the modulated receiver output signal has its optimum reception. As long as the IF frequency differs from the desired optimum IF frequency, the frequency control signal c4 has an error value and the frequency l2 of the local oscillator will be corrected until the frequency offset has its desired value. For keeping a fixed frequency distance (offset) between the second transmission signal t2 and the frequency of the (tuned) local laser L2, both signals are supplied to an auxiliary receiver R2$a$ in which t2 and l2 are mixed, resulting in an IF signal which is fed to a control unit AFC. In this control unit AFC the frequency of the IF signal is compared with a certain (offset) frequency, which is equal to the difference between the frequency of the transmission signal t2 and the frequency of the local laser signal l1. As long as the IF frequency differs from the desired offset frequency, the frequency control signal c2 has an error value and the frequency f2 of the transmitter R2 will be corrected until the frequency offset has its desired value.

At the network centre's side the second transmission signal t2, received from the subscriber's transmitter R2, is fed to the receiver R1 and is mixed with the local oscillator signal l1. It is not necessary to tune the local oscillator L1 to a frequency at which the demodulated output signal of the receiver R1 has its optimum. Instead of tuning the local oscillator L1 during the reception of the transmission signal t2 from the subscriber's side, its frequency is—as long as transmitter T1 generates its transmission signal t1—maintained on a fixed distance from the frequency f1 of the first transmitter T1. For that purpose (part of) transmission signal t1 is fed to an auxiliary receiver R1$a$ and also (part of) local oscillator signal l1, resulting in an IF signal which is fed to an AFC-unit, generating a control signal c3 which has an error value until the desired frequency offset between the frequency f1 of the transmission signal t1 and the frequency f3 of the local oscillator L1 has been reached.

Figure 3:
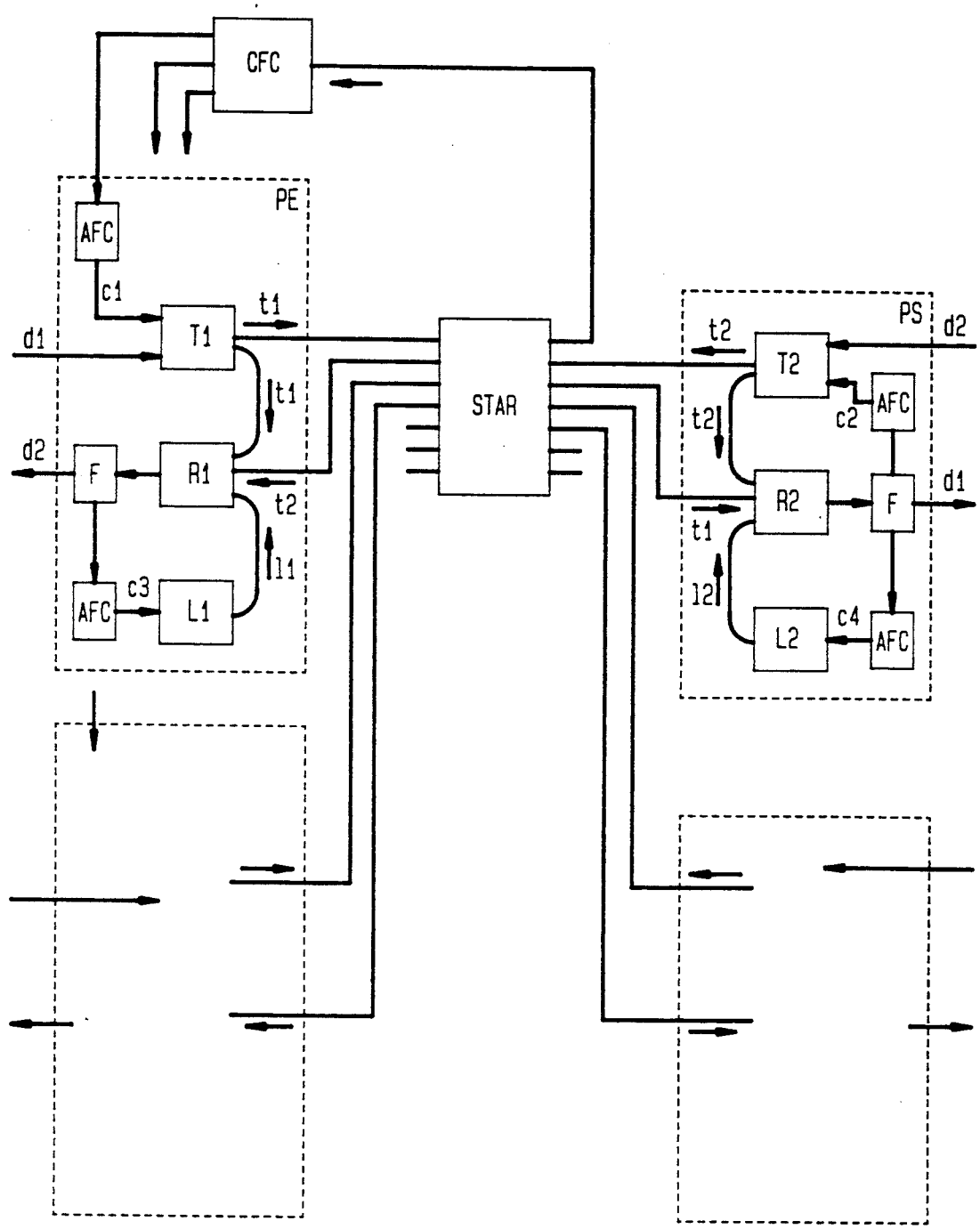
FIG. 3 shows a second preferred implementation of the invention, in which frequency locking is carried out by means of electric filters (together with the main receivers) and AFC-units.

FIG. 3 shows an embodiment of the invention in which the control signals c2...c4 are achieved in the electric domain. At the subscriber's side, locking the frequency of the second transmitter T2 to the frequency of the second local oscillator L2 is achieved by feeding part of the transmitted signal t2 to its "own" receiver (the second receiver) R2. So in the receiver R2 the first transmitter signal t1, received from the network centre (transmitter T1), and (part of) the second transmitter signal t2 are mixed with the second local oscillator signal l2, resulting in two IF signals: one IF signal resulting from mixing t1 and l2 with the IF-frequency $|f1-f4|$ and one IF signal resulting from mixing t2 and l2 with the frequency $|f2-f4|$. These IF signals are separated from each other by an electric filter F whereby the first mentioned IF signal ($|f1-f4|$) is used both for signal, indicated by d1 (data signal) and for tuning—via an AFC-unit—the frequency of the local laser L2 (control signal c4) to achieve the optimum receiver output. The last mentioned IF ($|f2-f4|$) signal is used to control—via an AFC-unit—the frequency setting of the second transmitter T2 (control signal c2), its frequency control loop thus being formed by the components T2, R2, F and AFC.

In the same way, at the network centre's side, the frequency f3 of the first local oscillator L1 is locked to the frequency f1 of the first transmitter T1. Part of the first transmitter signal t1 is fed to the first receiver R1 in which it is mixed with the local oscillator signal l1, resulting in an IF signal with the frequency $|f1-f3|$; the second transmission signal t2, received from the second (subscriber) transmitter T2, forms with the local oscillator signal l1 an IF signal too, having the frequency $|f2-f3|$. Both IF signals are fed to a filter F, which separates these IF signals in the IF signal ($|f2-f3|$) for forming—after demodulation the output signal, indicated by d2 (data signal). The other IF signal ($|f1-f3|$) controls—via an AFC-unit—the frequency setting of the first local oscillator L1 (control signal c3).

I claim:

1. Optical transmission network, comprising an optical transmission medium with one or more optical fibers, to which, at one side, one or more first optical transceivers are connected and to which, at the other side, one or more second transceivers are connected, said first transceivers each having a first transmitter and a first receiver and said second transceivers each having a second transmitter and a second receiver, a first transmission signal being transmitted by the first transmitter of a first transceiver and being received by the second receiver of a second transceiver, and a second transmission signal being transmitted by the second transmitter of that second transceiver and being received by the first receiver of that first transceiver, said first transceivers being located together in a network center and the frequencies of the first transmission signals as transmitted by the various first transmitters, each being kept at a fixed frequency relationship to one frequency of a common reference frequency source, the frequency of said second transmission signal, transmitted by the second transmitter, being kept at a fixed frequency relationship to the frequency of the first transmission signal as received by that second receiver from the first transmitter, characterized in that, in the second receiver, the received first transmission signal is mixed with a second local oscillator signal (l2), the frequency (f4) of which being tuned so that the reception of the first transmission signal has its optimum, and that, in the second transmitter, the frequency of the second transmission signal is kept at a fixed frequency relationship to the frequency of that tuned second local oscillator signal, and in that, in the first receiver, the received second transmission signal is mixed with a first local oscillator signal (l1), the frequency (f3) of which is kept at a fixed frequency relationship to the frequency of the first transmission signal as transmitted by the first transmitter.

2. Optical transmission network according to claim 1, characterized in that, in the second transceiver, part of the second local oscillator signal and part of the second transmission signal are supplied to a second auxiliary optical receiver (R2a) of which the electrical output signal is fed to an AFC-unit of which the output signal (c2) controls the frequency setting of the second transmitter.

3. Optical transmission network according to claim 1, characterized in that, in the first transceiver, part of the first local oscillator signal and part of the first transmission signal are supplied to a first auxiliary optical receiver (R1a) of which the electrical output signal is fed to an AFC-unit of which the output signal (c3) controls the frequency setting of the first local oscillator.

4. Optical transmission network according to claim 1, characterized in that, in the second transceiver, the second local oscillator signal, the first transmission signal and part of the second transmission signal are supplied to the second receiver and that the electric IF output signals resulting from that second receiver are supplied to a multiple electric pass filter (F) with a first output terminal with a passing frequency which is equal to the difference between the frequency of the first transmission signal and the frequency of the second local oscillator, which first output terminal forms the IF output terminal of the second receiver, which first output terminal, further more, is connected to an AFC-unit of which the output signal (c4) tunes the frequency setting of the second local oscillator, which electric filter, furthermore, has a second output terminal with a passing frequency which is equal to the difference between the frequency of the second transmission signal and the frequency of the second local oscillator, which second output terminal is connected to an AFC-unit of which the output signal (c2) controls the frequency setting of the second transmission signal to be transmitted by the second transmitter.

5. Optical transmission network according to claim 1, characterized in that, in the first transceiver, the first local oscillator signal, part of the first transmission signal and the second transmission signal are supplied to the first receiver and that the electric IF output signals resulting from that first receiver are supplied to a multiple electric pass filter with a first output terminal with a passing frequency which is equal to the difference between the frequency of the second transmission signal and the frequency of the first local oscillator, which first output terminal forms the F output terminal of the first receiver, which electric filter, moreover, has a second output terminal with a passing frequency which is equal to the difference between the frequency of the first transmission signal and the frequency of the first local oscillator, which second output terminal is connected to an AFC-unit of which the output signal (c3) controls the frequency setting of the first local oscillator signal.

6. Optical transmission system according to claim 1, characterized in that, if the frequency of the first transmission signal is indicated by f1, the frequency of the second transmission signal by f2, the frequency of the first local oscillator signal by f3, and the frequency of the second local oscillator signal by f4, the increasing order of those frequencies is f1-f4-f3-f2.

7. Optical transmission system according to claim 1, characterized in that, if the frequency of the first transmission signal is indicated by f1, the frequency of the second transmission signal by f2, the frequency of the first local oscillator signal by f3, and the frequency of the second local oscillator signal by f4, the increasing order of those frequencies is f2-f3-f4-f1.

8. Optical transmission system according to claim 1, characterized in that, if the frequency of the first transmission signal is indicted by f1, the frequency of the second transmission signal by f2, the frequency of the first local oscillator signal by f3, and the frequency of the second local oscillator signal by f4, the increasing order of those frequencies is f4-f1-f2-f3.

9. Optical transmission system according to claim 1, characterized in that, if the frequency of the first transmission signal is indicated by f1, the frequency of the second transmission signal by f2, the frequency of the first local oscillator signal by f3, and the frequency of the second local oscillator signal by f4, the increasing order of those frequencies is f3-f2-f1-f4.

* * * * *